United States Patent Office 3,582,425
Patented June 1, 1971

3,582,425
METHOD OF MANUFACTURING ELECTRIC COILS
Susumu Kenjo, Fujisawa-shi, Kanagawa-ken, and Yoshiharu Sano, Yokohama-shi, Kanagawa-ken, Japan, assignors to Tokyo Shibaura Denki Kabushiki Kaisha, also known as Tokyo Shibaura Electric Co., Ltd., Kanagawa-ken, Japan
No Drawing. Filed Apr. 28, 1969, Ser. No. 819,987
Claims priority, application Japan, May 6, 1968, 43/29,805
Int. Cl. H01b *19/04*
U.S. Cl. 156—275                4 Claims

ABSTRACT OF THE DISCLOSURE

Coils for use in electric machines and apparatus are insulated by first wrapping a self bonding mica base tape, containing a partially cured non-tacky resinous copolymer of an epoxy resin and a silicone resin, upon the coil conductor and then applying a coating of solventless resinous composition composed of an epoxy resin. The insulation thus formed is then completely cured to form an integral insulation structure. Connecting portions between coil sides are similarly insulated by successively applying layers of a self bonding mica base tape, a coating of the solventless resinous composition and a shrinkable film and then heating the assembly to completely cure the resinous compositions and to cause the shrinkable film to shrink, thus forming an integral insulation structure.

BACKGROUND OF THE INVENTION

This invention relates to a method of manufacturing coils for electric machines and apparatus having excellent corona-proof, water-proof and moisture-proof properties.

Coils of electric machines and apparatus, especially dynamoelectric machines of medium or larger size, are generally insulated in the following manner. Thus, for example, insulation tapes prepared by treating cotton cloth, glass cloth and the like with insulating compounds or varnishes or insulating tapes of paper, mica paper, mica glass or plastics are wrapped about the conductor of coils or windings. Then, layers of wrapped insulating tapes are impregnated with insulating compounds, varnishes or the like under vacuum, or said layers are subjected to pressure to prevent any air void from remaining in the resulting insulation structures. However, impregnation of such insulating layers with compounds and the like not only involves very difficult operations but also requires expensive equipment. Moreover, ordinary impregnating materials such as compounds, varnishes or the like have poor corona resistant properties. Thus, in the case of high voltage machines and apparatus, such impregnating materials tend to deteriorate during operation thereof. For this reason, prior impregnating materials can not completely fill air voids in insulations comprising such base materials as mica flakes, glass fibers or yarns. Moreover, even when electric coils or windings subjected to complicated treatments are assembled in the armatures of dynamoelectric machines, insulation provided for connecting portions between coil sides are very difficult to be impregnated with impregnating materials. Accordingly, in order to protect connecting portions against water or moisture it is often required to design dynamoelectric machines as the totally enclosed outer ventilation type.

SUMMARY OF THE INVENTION

It is therefore an object of this invention to provide a novel method of manufacturing coils and windings for electric machines and apparatus having excellent corona-proof, water-proof and moisture-proof properties.

The method of this invention comprises the steps of preparing a self bonding tape or sheet (hereinafter the term "tape" is used to mean both tape and sheet) by applying to an insulating material containing thin mica flakes as the basic composition, a copolymer resinous composition consisting of 60 to 90%, by weight, of epoxy resin containing a curing agent and 40 to 10%, by weight, of a silicone resin, and by partially curing the coated copolymer resinous composition, wrapping the self bonding tape about conductors of electric coils, applying a layer of an epoxy resin composition upon layers of said wrapped tape and curing the epoxy resin composition and the partially cured resin to integrally bond them together. Electric coils insulated in this manner are received in slots of armatures to form windings and connecting portions of adjacent coils are insulated by the steps described above.

The copolymerized resinous composition may be prepared by incorporating dodecenyl succinate anhydride to a composition consisting of 60 to 90%, by weight, of one or more epoxy resins such as Epicoat–828, 1001 or 1004 (sold by Shell Chemical Company, Limited, U.S.A.) and 40 to 10%, by weight, of an organosilicone represented by a general formula

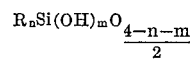

where R represents an organic radical, $n$ equals 1 to 2 and $m$ represents the number of hydroxyl groups which is determined by the molecular weight of the organopolysiloxane, heating the mixture to a temperature ranging from 150° C. to 170° C. in the presence of an aromatic hydrocarbon, such as toluene, to effect copolymerization thus obtaining a varnish. The varnish is then applied onto or impregnated into a thin insulating material utilizing as its base, mica in the form of mica paper, mica glass, mica mat-polyethylene terephthalate, and then the treated insulation is subjected to a drying step for about 100 to 500 hours at a temperature of 20 to 50° C., thus obtaining an insulation tape which is substantially non-tacky at room temperature, and wherein the applied resinous composition has been partially cured.

Ranges of 60 to 90%, by weight, for the epoxy resin component and 40 to 10%, by weight, for the organosilicone resin component utilized in the above described composition are selected by the reason that, outside these ranges, the corona-proof property and mechanical strength characteristic of the resulted insulation are degraded. Further decrease in the quantity of the coated resin below 30%, by weight, based on the total weight of the mica base insulating material results in the degradation of the moisture-proof and water-proof properties of the insulation whereas increase in the quantity of the coated resin beyond 50%, by weight, results in troublesome wrapping steps of the insulation.

The solventless type resinous composition applied on the layers of the insulating tape can be prepared from 95 to 99.5 parts, by weight, of a mixture consisting of an epoxy resin, such for example as polycaster No. 5 (trademark), Epicoat 828 (trademark) and the like and a suitable curing agent such as dodecenyl succinate anhydride, and 5 to 0.5 parts by weight of a suitable curing agent such as benzyldimethylamine. Quantities of the curing catalyst of less than 0.5 part, by weight, result in an increase in the curing temperature to more than 160° C., thus completing the heat treatment step, whereas quantities above 5 parts, by weight, result in the degradation of the electrical characteristics. Accordingly, the quantity of the curing catalyst is limited within said range.

In this manner, according to this invention, the resin layer of the mica base insulating tape comprising the essential portion of the insulation system is in the partially cured state so that it exhibits only a little tackiness thus permitting easy handling. However, when subjected to pressure, the layers of the tape can adhere to each other to form strong bonding. The solventless resinous composition applied on the layers of the tape can be readily cured when heated to a temperature of 100 to 150° C., for example, or when it is left standstill in air at room temperature, by the action of the curing catalyst. Simultaneously, the partially cured resinous composition in the tape is also cured completely, thus forming an integral insulation structure. More particularly, when subjected to pressure and/or heat, both the partially cured resinous composition and the solventless resinous composition become tacky and are perfectly cured so that an integral, void free insulation structure can be obtained. Absence of any void improves the corona-resistant property of the insulation structure.

Connecting portions between coil sides of a winding accommodated in the armature slots can also be insulated by the same insulating material and process steps as the coil sides of the winding. According to this invention, the required pressure is applied to the insulation formed on the connecting portion by a shrinkable film of polyethylene terephthalate for example. As a consequence, the insulation of the winding is uniform throughout its respective coil sides and connecting portions, so that the moisture-proof and water-proof properties as well as the electrical characteristics of the winding can be greatly improved over windings with conventional insulation systems. Thus, this invention can eliminate a step of impregnating under vacuum the layers of a tape with an insulating compound or a varnish and can prevent flow out of the impregnated compound or varnish at the time of heating for effecting drying and curing. Accordingly, the insulation structure of this invention is especially suitable for motors operated in water or under high humidity environment. When a semiconductive coating material is applied over the entire surface of the coil, it is possible to entirely eliminate corona at portions of the winding outside the slots.

DESCRIPTION OF THE PREFERRED EMBODIMENT

The following specific example is given by way of illustration, and is not to be construed as limiting in any way the scope and spirit of the invention. All parts are by weight.

Example

A composition consisting of 27% of Epicoat 828 (trademark), 27% of Epicoat 1001 (trademark), 26% of dodecenyl succinate anhydride and 20% of a hydropolysiloxane (having an average molecular weight of 950) was heated at a temperature ranging from 160° C. to 180° C. for five hours under reflux of xylene to effect copolymerization reaction. The resulted composition was diluted with toluene so as to obtain a varnish containing 50% of resin component. The varnish was applied to a mica mat paper and dried at a temperature below 40° C. for 200 hours to evaporate off the solvent. In this condition, the resinous composition was partially cured and substantially non-tacky. The mica mat paper was then cut into mica base insulating tapes.

The insulating tape was wrapped around a conductor of coils of an electric motor to form several superposed layers, and a solventless resinous composition was applied on the layers consisting of 40% of Epicoat 828, 20% of Polycaster No. 5, 36% of dodecenyl succinate anhydride and 4% of benzylmethylamine. Then, the treated conductor was heated at a temperature below 130° C. to partially cure the resinous compositions. Coil sides insulated as above described and to be received in armature slots were formed or molded to have a rectangular cross-section according to the usual practice and connecting portions between coil sides were insulated by wrapping the insulating tape and then coating the layers of the tape with the solventless resinous composition. Shrinkable film of polyethyleneterephthalate was wrapped about the insulations formed on the connecting portions and the coil was heated at a temperature of 130° C. for more than three hours to effect drying and curing of the resinous composition. During this heat treatment both the partially cured resinous composition and the solventless resinous composition first became tacky and then completely cured. When heated, the shrinkable film of polyethyleneterephthalate shrinked greatly to apply a large compressive force upon the insulations at the connecting portions. Thus it is possible to provide dense insulating structures to the connecting portions which are perfectly cured, strong and have high insulating strength and excellent moisture-, corona- and water-proof properties as the remaining portions of the coils.

A stator of a high voltage motor having coils insulated as above described was bodily immersed in tap water, removed after 24 hours and the variation in the insulation resistance due to water absorbed by the insulation was measured. Before immersion, the insulation resistance was more than 2000 megohms whereas it was decreased to 500 megohms, which was much higher than that of conventional motors.

While spraying water from a hose upon a similar high voltage motor, particularly upon the connecting portions between coils, the insulation resistance was measured. It was found that the insulation resistance of more than 2000 megohms, was maintained before and after the spray. After standstill for 24 hours the insulation resistance was the same as before the spray.

If desired, between layers of the insulating tape treated with epoxy resin component and silicone resin component and the coating of the solventless resinous composition may be interposed layers of a silicone rubber tape reinforced with a cloth. Alternatively, such layers of silicone rubber tape may be applied on the coating of the solventless resinuous composition in order to improve the anti-tracking property of the insulation system. Such silicone rubber tape may be prepared by applying a composition consisting of 97% of a silicone rubber composition and 3% of a suitable curing agent upon a glass cloth, heating the applied silicone rubber coating to 120° C. for two hours to completely cure the silicone rubber, applying a varnish containing said epoxy resin component and silicone resin component onto the cured silicone rubber layer, and partially curing the epoxy and silicone components to obtain a non-tacky surface. In this manner, as the surface of the silicone rubber tape is coated with a curable resinous composition, when the insulation system is subjected to the final heat treatment all layers are united into a unitary structure containing no voids.

We claim:

1. A method of manufacturing an electrical coil comprising the steps of preparing a self bonding tape by applying to a mica base insulating material a copolymer resinous composition consisting of 60 to 90%, by weight, of any epoxy resin containing a curing agent and 40 to 10%, by weight, of a silicone resin, and by partially curing the coated copolymer resinous compositions; wrapping said self bonding tape about a conductor of the coil; applying to the layers of said self bonding tape a coating of a solventless resinous composition consisting of 95 to 99.5%, by weight, of an epoxy resin component and 0.5 to 5%, by weight, of a curing agent; and completely curing said partially cured self bonding tape and said coating to form an integral insulation structure.

2. The method of manufacturing an electrical coil according to claim 1 wherein said self bonding tape contains 30 to 50% by weight of said copolymer resinous composition.

3. In a method of manufacturing an electrical winding including a plurality of insulated electrical coil sides electrically interconnected by connecting portions, the improvement which comprises the steps of preparing a self bonding tape by applying to a mica base insulating material a copolymer resinous composition consisting of 60 to 90%, by weight, of an epoxy resin containing a curing agent and 40 to 10%, by weight, of a silicone resin, and by partially curing the coated copolymer resinous composition; wrapping said self bonding tape about respective connecting portions of said winding; applying to the layers of said self bonding tape a coating of a solventless resinous composition consisting of 95 to 99.5%, by weight, of an epoxy resin component and 0.5 to 5%, by weight, of a curing agent; applying a shrinkable film on said coating of solventless resinous composition and heating said connecting portions to effect complete curing of said copolymer resinous composition and said solventless resinous composition and to cause said shrinkable film to shrink.

4. The method of manufacturing an electrical winding according to claim 3 wherein each of said coil sides are insulated by the method recited in claim 1.

References Cited

UNITED STATES PATENTS

| | | | |
|---|---|---|---|
| 2,626,223 | 1/1953 | Sattler et al. | 156—52X |
| 2,692,218 | 10/1954 | Nicoll et al. | 156—52 |
| 3,033,727 | 5/1962 | Cram et al. | 156—53X |
| 3,427,189 | 2/1969 | Brechna | 156—53X |

FOREIGN PATENTS

| | | | |
|---|---|---|---|
| 870,430 | 6/1961 | Great Britain | 156—330 |

LELAND A. SEBASTIAN, Primary Examiner

E. E. LEHMANN, Assistant Examiner

U.S. Cl. X.R.

156—53, 86, 172